United States Patent Office

3,528,792
Patented Sept. 15, 1970

3,528,792
METHOD OF SPIN CASTING GLASS CASING
Robert Wilson, Dallas, Tex., assignor to Atlantic Richfield Company, Philadelphia, Pa., a corporation of Pennsylvania
No Drawing. Filed May 6, 1968, Ser. No. 727,042
Int. Cl. C03b 19/04
U.S. Cl. 65—71    3 Claims

ABSTRACT OF THE DISCLOSURE

A method of spin casting tubular glass pipe wherein sufficient molten metal is spun in a cylindrical, centrifugal mold to form a wall or layer of the molten metal on the sides of the mold. The molten metal is denser than the glass, has a melting point below the temperature at which the glass is removed from the mold, has a boiling point above the temperature at which the glass is cast, and is sufficiently unreactive with the glass to not change the properties of the glass. After the molten metal layer has been formed, flowable glass is spin cast in the spinning mold while the layer of molten metal is on the sides of the mold. Preferably, tin is the metal used.

BACKGROUND OF THE INVENTION

This invention provides an improved method of spin casting glass pipe.

It has been proposed to use glass tubular pipe as the tubing and casing in oil and gas wells. The use of glass pipe for this purpose requires a very strong glass with a high degree of quality and reliability.

One major cause of failure in glass casing and tubing is the presence of surface imperfections created during manufacture of glass pipe. These surface imperfections act as stress risers and greatly weaken the tensile strength of the glass pipe.

One method of manufacturing glass pipe is to spin cast the pipe in a cylindrical mold. The ingredients for forming glass or gobs of molten glass from a feeder are fed into a cylindrical mold which spins so rapidly that centrifugal force causes the molten glass to flow around the sides of the mold and form a wall of glass of uniform thickness. The spin cast glass is then heat treated to obtain the desired properties such as strain relief, crystalline structure, and the like. This heat treatment involves controlled cooling of the glass or cyclic cooling and reheating of the glass. The glass is usually cooled to a predetermined temperature prior to removal from the mold or if desired, the glass may be reheated to remove the glass from the mold. This exit temperature may be raised to about 395° centigrade without harming the glass.

SUMMARY OF THE INVENTION

This invention provides an improvement in the spin casting of glass tubular pipe. The improvement involves spinning sufficient melted metal in a cylindrical, centrifugal mold to form a wall or layer of the melted metal on the sides of the mold. The mold is at a temperature above the melting point of the metal. The metal has a specific gravity greater than the specific gravity of the glass to be molded in the mold. The metal also has a melting point low enough to permit removal of the molded glass pipe from the mold while the metal is in its liquid state. The metal also has a boiling point above the temperature at which the glass is cast and is sufficiently unreactive with the glass to not change the properties of the glass. After the layer of melted metal has been formed on the sides of the mold, glass is spin cast in the mold while the mold is still spinning and the layer of melted metal is on the sides of the mold to form glass pipe. Centrifugal force forces molten glass to form a layer of glass on the layer of melted metal. The melted metal is not displaced by the glass because of centrifugal force and because the metal has a specific gravity greater than the glass.

Preferably, the melted metal, which is unreactive with the glass, will have a specific gravity at least twice that of the glass and will melt at a temperature below 250° centigrade. The metal has a boiling point above the temperature at which the glass is cast. It is preferred that the metal be composed essentially of tin. The tin contains no chemical elements which would interfere with this method.

DESCRIPTION OF PREFERRED EMBODIMENTS

This invention pertains to an improved method of spin casting glass pipe. Since means and methods for spin or centrifugal casting of glass pipe are well-known, the following description will be limited to the features of spin casting that are necessary to an understanding of this invention.

In spin casting of glass, a cylindrical, heated mold is spun at a speed sufficient to centrifugally force molten glass around the sides of the mold to form glass pipe. The flowable glass has a specific gravity between 2.2 and 4.3 with the usual specific gravity range being between 2.2 and 2.5. The glass is centrifugally cast at a temperature between 850° centigrade and 2000° centigrade.

In the improvement of this invention, prior to adding glass to the mold, a metal is spun in the mold at a temperature above the melting point of the metal. The amount of metal added to the mold is sufficient to form a smooth wall or layer of melted metal on the sides of the mold. It is on this smooth liquid layer of melted metal that the glass pipe will be formed.

The metal is compatible with the glass, that is, the metal does not react with the glass in amounts sufficient to change the properties of the glass. In order for the metal to form a liquid layer on which the glass will be cast, the metal must have a specific gravity greater than that of the glass to be molded. Preferably, for greatest reliability, the specific gravity of the metal will be greater than one and one-half times the specific gravity of glass and even denser metals will be used since the gravity of the metal will usually be at least twice the specific gravity of glass. For example, the preferred metal for this process is tin which has a specific gravity of about 7.28 which is more than double the usual specific gravity for glass.

The melting point of the metal must be low enough to permit removal of the glass from the mold at a predetermined temperature which is below a temperature which could adversely affect the properties of the glass. The melting point of the metal layer should, therefore, be below 395° centigrade and preferably below 300° centigrade. Tin has a melting point of about 232° centigrade.

The metal must also have a boiling point above the temperature at which glass is centrifugally cast. The boiling point of the metal should be above 1300° centigrade and more preferably, above 2000° centigrade. Tin has a boiling point of about 2270° centigrade. Other pure metals which fall within some of the less strict requirements are gallium, indium, thallium, bismuth and lead; but the only metal meeting all of the requirements and essentially inert to glass pipe casting is tin. If other metals were used, they would need to be alloyed with tin or one of these pure metals, in amounts low enough for the alloy to meet these requirements and none of the metals in the alloy will have a boiling point below the temperature at which the glass is cast.

After a layer of melted metal is formed on the sides of the mold and while the mold is still spinning, glass pipe is spin cast in the mold at a temperature between 850° centigrade and 2000° centigrade. Centrifugal force forces molten glass to form a layer of glass over the melted metal. The melted metal being substantially denser than glass is not displaced by the glass layer.

When the glass pipe has been formed, the glass is heat and chemically treated to obtain the desired properties and relieve strains. When the glass pipe has been so treated and cooled, the glass pipe is removed from the mold. The glass pipe is removed at a predetermined temperature above the melting point of the metal layer and below a temperature which will adversely affect the properties of the glass pipe. This temperature will be below 395° centigrade and usually below 300° centigrade. The metal used to form the layer, therefore, will have a melting point below this predetermined temperature.

As will be apparent, this invention is not limited to any particular centrifugal mold so long as the mold is for spin casting glass pipe and to any particular ingredients for making glass or the way that such ingredients or molten glass are added to the spinning mold provided that the conditions set forth in the appended claims are satisfied.

What is claimed is:

1. In a method of spin casting tubular glass pipe wherein flowable glass is spun in a cylindrical mold to centrifugally force said glass around the sides of said mold and the molded glass is removed from the mold at a predetermined temperature, the improvement comprising spinning sufficient metal in said mold at a temperature above the melting point of said metal to form a wall of said melted metal on said sides of said mold, said metal being spun in said mold prior to placing said glass in said mold, said metal being sufficiently unreactive with said glass to not change the properties of said glass and said metal having a specific gravity greater than the specific gravity of said glass, having a melting point below said predetermined temperature and having a boiling point above the temperature at which the glass is molded, and spin casting glass in said mold on said melted metal while spinning said mold and said melted metal to form tubular glass pipe.

2. The improvement of claim 1 wherein the metal consists of tin.

3. The improvement of claim 1 wherein the metal consists of an alloy of tin.

References Cited

UNITED STATES PATENTS 3,010,153 11/1961 Bittner _____ 65—302 XR
3,245,770 4/1966 Cortright et al. _____ 65—71

S. LEON BASHORE, Primary Examiner

S. R. FRIEDMAN, Assistant Examiner

U.S. Cl. X.R.
65—24, 302